Z. R. DELLA VENERIA.
ELECTRIC STARTER FOR INTERNAL COMBUSTION ENGINES.
APPLICATION FILED MAR. 11, 1921.
1,433,760.
Patented Oct. 31, 1922.
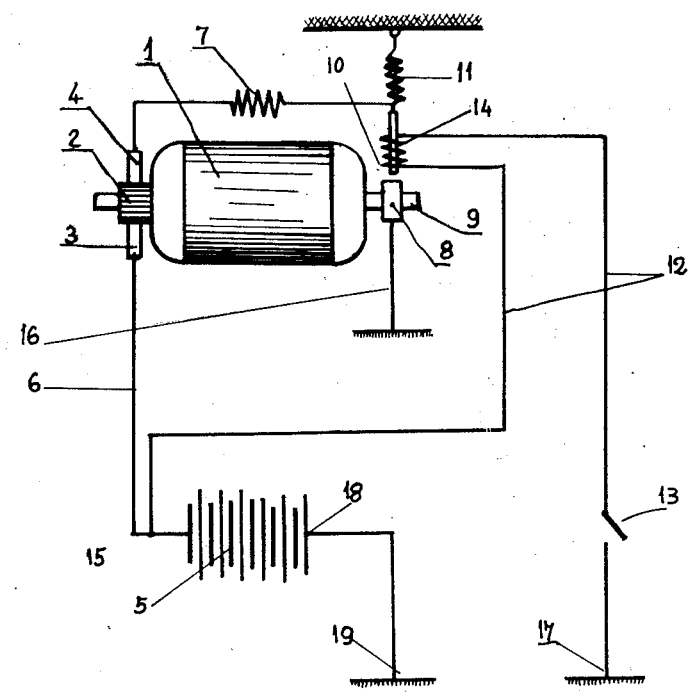

Patented Oct. 31, 1922.

1,433,760

UNITED STATES PATENT OFFICE.

ZAVERIO REVIGLIO DELLA VENERIA, OF TURIN, ITALY.

ELECTRIC STARTER FOR INTERNAL-COMBUSTION ENGINES.

Application filed March 11, 1921. Serial No. 451,473.

*To all whom it may concern:*

Be it known that I, ZAVERIO REVIGLIO DELLA VENERIA, a subject of the King of Italy, residing at 39 via Carlo Alberto, Turin, in the Kingdom of Italy, electrical engineer, have invented certain new and useful Improvements in Electric Starters for Internal-Combustion Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to electric starters for internal combustion engines and has the characteristic feature that the closing of the circuit of the starter or motor is effected through a secondary brush adapted to contact with a ring or equivalent on the armature shaft. The brush is operated to close the circuit, when required, by a solenoid or electromagnet included in a secondary circuit controlled by a distant switch or, if desired, it may be operated mechanically by suitable levers or tie-rods or the like.

The arrangement in accordance with the present invention is of simple construction, is reliable in operation, and prevents or minimizes sparking thereby resulting in increased durability.

Existing methods of controlling the operation of electric starting motors, whether they involve the use of mechanical or electric means, are open to several disadvantages.

The mechanical devices are complicated and generally necessitate an excessive current in the circuit connecting the motor with the switch and the battery, with the result that expense is increased, power is lost, and much space is taken up in the vehicle.

The electric devices on the other hand are more practical in character, and serve to break or interrupt the main circuit at a distance. One or more relays are inserted in a secondary circuit for this purpose or, instead of this arrangement, the commutator brushes are lifted and lowered directly to break and make the circuit. In the first case the breaking and the making of the circuit take place between two metallic parts, which soon get worn owing to sparking, or they may even fuse and stick together, which is still worse, for then they keep the main circuit closed even when the relay circuit is opened or broken. In the second case the succession of breaks may give rise to bad contact of the brushes with consequent sparking and pitting of the surface of the commutator thereby rendering the motor unreliable in operation.

All these troubles are overcome by the present invention, for the making and breaking of the main circuit is effected on an ample rotating surface, afforded by the aforesaid ring or equivalent on the armature shaft. The brushes are in constant contact with the commutator and therefore they can be easily adjusted to avoid sparking. Further, it is possible to effect the closing of the motor circuit by means of a single relay, even in the case of motors with four or more commutator brushes.

One form or embodiment of the invention is shown diagrammatically, by way of example, on the accompanying drawing, whereon:

1 represents the armature of an electric starting motor, 2 the commutator and 3, 4 the commutator brushes. The brush 3 is connected, by a conductor 6, with a suitable source of supply of electric energy, shown in this instance as a battery 5, and the brush 4 is connected with the series field winding 7 of the motor. A ring or disc or equivalent 8 is secured on the armature shaft 9 but is not electrically insulated from it,—that is to say it is earthed through the frame of the motor—and a secondary brush 10 is normally held out of contact with the ring 8, by a spring 11. The brush 10 is adapted to make contact with the ring whenever the solenoid 14 is energized by closing a secondary circuit 12 through the medium of switch 13.

Both the main circuit through the motor and the secondary circuit through the solenoid are connected to the battery 5, at the pole or terminal 15 and are completed back to the battery through the frame from the terminals 16 and 17 respectively, the other pole 18 of the battery 5 being connected to the frame at 19.

When the switch 13 is open, the secondary circuit 12 is broken and the secondary brush 10 is kept out of contact with the ring 8 by means of the spring 11; consequently the series field 7 of the circuit is interrupted between the ring 8 and the brush 10, with the result that the motor stands at rest.

When the switch 13 is closed, current circulates in the secondary circuit 12 and energizes the solenoid 14. The latter, overcoming the effect of the spring 11 brings the brush into contact with the ring 8, which is earthed or in electric connection with the frame, thereby closing the circuit of the motor and setting the latter in operation.

As soon as the switch 13 is opened again current ceases to flow in the secondary circuit 12, the solenoid is deenergized and the brush 10 is moved from contact with the ring 8 under the action of the spring 11. The main circuit through the motor is thus interrupted and the motor stopped.

Claims:

1. An electric starter for internal combustion engines, comprising a battery circuit including a dynamo armature and a series field-winding therefor, a grounded contact ring on the armature, a contact connected to said field winding normally out of engagement with said ring, and means to cause said contact to move into engagement with said ring and close circuit through the armature and field winding.

2. An electric starter for internal combustion engines comprising a battery circuit including a dynamo armature and a series field-winding therefor, a grounded contact ring on the armature, a contact connected to said field winding normally out of engagement with said ring, a secondary circuit containing a solenoid on said contact, and a switch in said secondary circuit upon the closing of which the solenoid is energized and causes said contact to engage said ring and close the battery circuit through the armature and field winding.

In testimony that I claim the foregoing as my invention, I have signed my name.

ZAVERIO REVIGLIO DELLA VENERIA.